(12) United States Patent
Lesartre et al.

(10) Patent No.: US 10,191,884 B2
(45) Date of Patent: Jan. 29, 2019

(54) MANAGING A MULTI-LANE SERIAL LINK

(71) Applicant: HEWLETT PACKARD ENTERPRISE DEVELOPMENT LP, Houston, TX (US)

(72) Inventors: Gregg B. Lesartre, Fort Collins, CO (US); Martin Foltin, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 267 days.

(21) Appl. No.: 15/108,633

(22) PCT Filed: Jan. 28, 2014

(86) PCT No.: PCT/US2014/013419
§ 371 (c)(1),
(2) Date: Jun. 28, 2016

(87) PCT Pub. No.: WO2015/116037
PCT Pub. Date: Aug. 6, 2015

(65) Prior Publication Data
US 2016/0328356 A1    Nov. 10, 2016

(51) Int. Cl.
*G06F 13/42* (2006.01)
*G06F 13/38* (2006.01)
*G06F 13/40* (2006.01)

(52) U.S. Cl.
CPC ........ *G06F 13/4286* (2013.01); *G06F 13/385* (2013.01); *G06F 13/405* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 8,208,467 | B2 | 6/2012 | Kapil et al. |
| 8,527,676 | B2 | 9/2013 | Morrison et al. |

(Continued)

FOREIGN PATENT DOCUMENTS

| CN | 101465803 | | 6/2009 |
| TW | 200538939 | A | 12/2005 |
| TW | 200836509 | A | 9/2008 |

OTHER PUBLICATIONS

Micrel; "SY87725L"; http://www.micrel.com/index.php/component/joodb/article/85-muxdemux/2-sy87725l.html; 2 page.

(Continued)

*Primary Examiner* — Hyun Nam
(74) *Attorney, Agent, or Firm* — Fabian VanCott

(57) ABSTRACT

A method for managing a multi-lane serial link is described. The method includes establishing a serial link between a number of integrated circuits across a first number of lanes. The first number of lanes are a subset of a number of available lanes on the serial link. The method also includes selecting to change a transmission state of a second number of lanes. The second number of lanes are a subset of the available lanes. The method also includes changing the transmission state of the second number of lanes while transmitting data on a number of remaining lanes. The method further includes synchronizing the first number of lanes and the second number of lanes.

17 Claims, 7 Drawing Sheets

(56) References Cited

U.S. PATENT DOCUMENTS

| | | | |
|---|---|---|---|
| 2002/0118701 A1* | 8/2002 | Wallois | H04M 11/066 370/465 |
| 2005/0262284 A1 | 11/2005 | Cherukuri | |
| 2007/0133311 A1* | 6/2007 | Kim | G06F 13/4243 365/189.02 |
| 2009/0086870 A1 | 4/2009 | Mohiuddin | |
| 2009/0150707 A1 | 6/2009 | Drucker et al. | |
| 2011/0173352 A1* | 7/2011 | Sela | G06F 1/3253 710/16 |
| 2012/0230455 A1* | 9/2012 | Hennedy | H04L 25/14 375/354 |
| 2013/0177324 A1 | 6/2013 | Tsubota | |
| 2014/0325124 A1* | 10/2014 | Antonakopoulos | G11C 14/009 711/103 |

OTHER PUBLICATIONS

International Search Report and Written Opinion of the International Seaching Authority dated Oct. 20, 2014, Application No. PCT/US2014/013419 filed Jan. 28, 2014, 12 Pages.

\* cited by examiner

MANAGING A MULTI-LANE SERIAL LINK

BACKGROUND

Links between computing devices, or components on a single computing device, allow the devices or components to share information between one another. The performance of computing devices may rely on the performance of these links. For example, a link may transmit data quickly and deliver higher bandwidth. A link may be serial, meaning data is transferred over the link sequentially. A link may include a number of lanes of communication. For example, a multi-lane serial link may include a number of lanes, each lane transmitting data sequentially.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
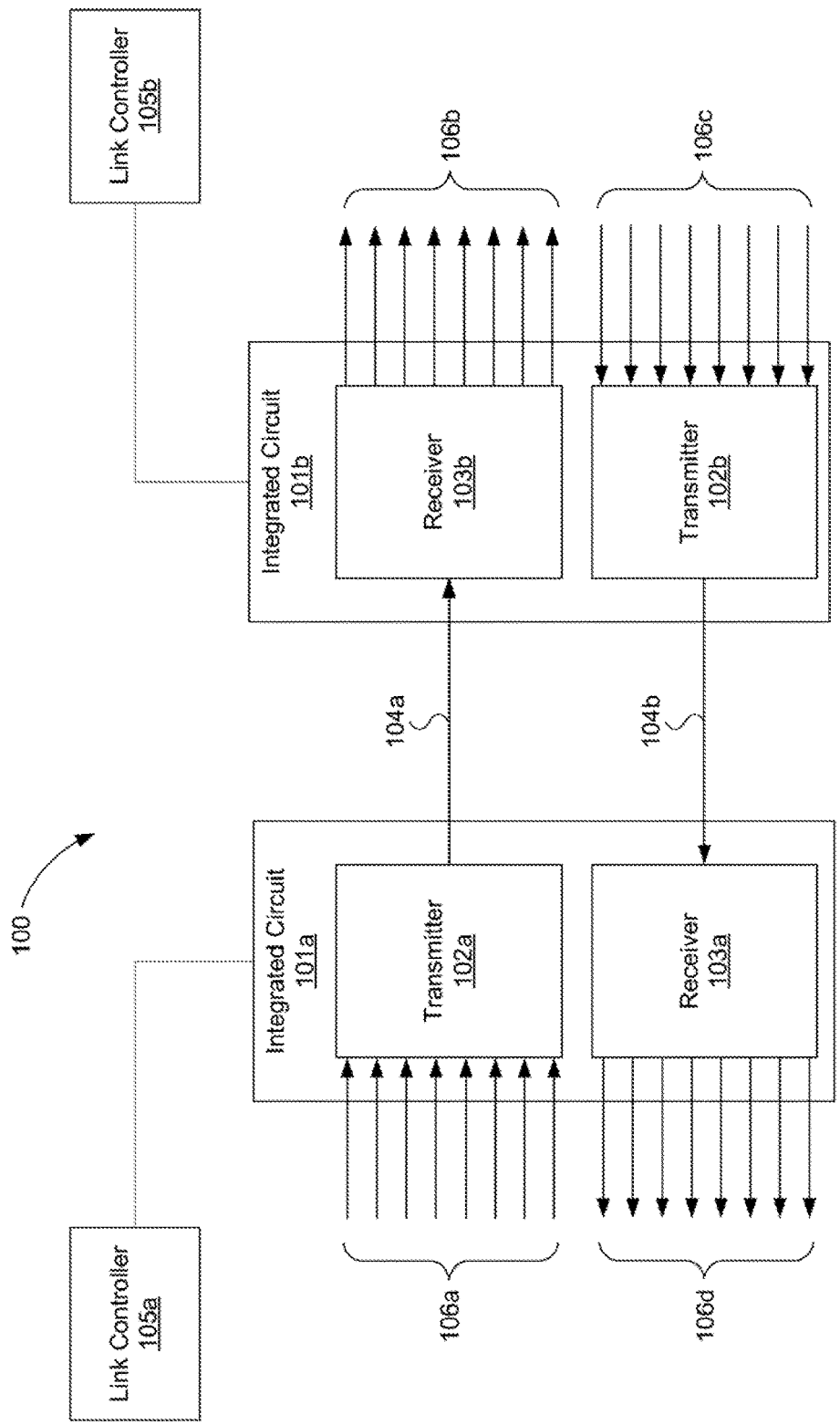
FIG. 1 is a diagram of a system for managing a multi-lane serial link according to one example of the principles described herein.

As described above, businesses, organizations, and other users may rely on the performance of links to effectively transmit data between a number of computing devices or a number of components on a single computing device. There are a number of types of links that may be used to transmit data. For example, a serial link may transmit data sequentially over a communication channel. A serial link may provide reliable, cost-effective and low power transmission of data. In another example, a parallel link may transmit data over a number of parallel communication channels simultaneously. Businesses, organizations, and other users may use serial links and parallel links as desired. In some examples, a business, organization, or other user may use a combination of serial links and parallel links to transmit data. For example, a business may use a serializer/deserializer (SerDes) device to convert parallel data into serial data, or vice-versa. In this example, the SerDes device may facilitate the use of serial links to transmit parallel data. Doing so may reduce number of connecting pins and may reduce a quantity of a transmission component. A transmission component may include wires, fibers, and free space communication, among other transmission components. Such a link may exhibit good power efficiency as indicated by bits transferred per unit of power. A SerDes device may be used to provide high levels of bandwidth in low power communication systems.

For some applications, bandwidth use may vary with time and power efficiency may be sacrificed if bandwidth is provided at high levels at all times. Accordingly, in some examples, a serial link may be a multi-lane link, meaning multiple lanes are used to transmit serial data. The lanes in a serial link may be able to be shut-off or added such that a user may select a number of lanes by which to transmit data. This may provide flexibility in the bandwidth used for transmission by allowing more, or fewer, lanes be used for transmission. However, while such multi-lane serial links may be beneficial, some characteristics of the links may reduce their effectiveness.

For example, the interfaces of the computing devices or components that are linked by these serial links may go through a training period to support a modification of the number of lanes used to transmit data. Such training may include adjusting clocks, sending and receiving transmission patterns, among other lane establishment procedures. During this training period, all lanes in the link are shut down. This may result in a less than satisfactory experience. For example, if it is determined that more serial lanes are to be used, all lanes in the link are shut down so that the lanes to be added may be "trained." Accordingly, existing bandwidth is lost, and communication latency is increased just when the system needs an increase in bandwidth.

Accordingly, the present disclosure describes systems and methods for managing a multi-lane serial link. More specifically, the present disclosure allows for a multi-lane serial link to provide increased bandwidth without a period of decreased bandwidth as the number of lanes used in a serial link is adjusted. The present disclosure describes a separation of the training function and a data transmission function of the lanes of a multi-lane serial link. More specifically, the systems and methods disclosed herein allow for lanes that are currently transmitting data to continue to transmit data even as other lanes that are being added, or removed, are being configured. Once the lanes to be added are "trained" or the lanes to be removed are shut down, a simple synchronization of all the lanes is performed. This synchronization may result in a shortened period during which bandwidth is reduced.

The present disclosure describes a method for managing a multi-lane serial link. The method may include establishing a serial link between a number of integrated circuits across a first number of lanes. The first number of lanes may include a subset of a number of available lanes on the serial link. The method may also include selecting to change a transmission state of a second number of lanes. The second number of lanes may include a subset of the available lanes. The method may also include changing the transmission state of the second number of lanes while transmitting data on a number of remaining lanes. The method may also include synchronizing the first number of lanes and the second number of lanes.

The present disclosure describes a system for managing a multi-lane serial link. The system may include a processor and memory communicatively coupled to the processor. The system may also include a link controller. The link controller may include an establish module to establish a serial link between a number of integrated circuits across a first number of lanes. The first number of lanes may include a subset of a number of available lanes on the serial link. The link controller may include a change module to change a transmission state of a second number of lanes while transmitting data on a number of remaining lanes. The second number of lanes may include a subset of the available lanes. The link controller may include a synchronization module to synchronize the first number of lanes after changing the transmission state of the second number of lanes.

The present disclosure describes a computer program product for managing a multi-lane serial link. The computer program product may include a computer readable storage medium that may include computer usable program code embodied therewith. The computer usable program code may include computer usable program code to, when executed by a processor, establish a first serial link between a number of integrated circuits across a first number of lanes. The first number of lanes may include a subset of a number of available lanes on the serial link. The computer usable program code may include computer usable program code to, when executed by a processor, select to change a transmission state of a second number of lanes. The second number of lanes comprises at least one of the available lanes. The computer usable program code may include computer usable program code to, when executed by a processor, change the transmission state of the second number of lanes while transmitting data on a number of remaining lanes. The computer usable program code may include computer usable program code to, when executed by a processor, synchronize the first number of lanes and the second number of lanes for data transmission.

The systems and methods described herein may be beneficial by quickly adjusting the bandwidth provided during transmission without disrupting the currently available bandwidth. This may allow for flexible management of transmission power while reducing any performance impact as a result of the adjustments.

As used in the present specification and in the appended claims, the term "lane" may refer to a communication route along a serial link. For example, a serial link may include a number of lanes that are used to transmit data serially.

Further, as used in the present specification and in the appended claims, the term "transmission state" may refer to whether or not a lane is presently transmitting data. For example, an "active transmission state" may refer to a lane of a serial link that is currently transmitting data between computing devices or components of a single computing device. By comparison, a "dormant transmission state" may refer to a lane of a serial link that is not currently transmitting data between computing devices or components of a single computing device.

Still further, as used in the present specification and in the appended claims, the term "subset" or similar language may include all, or part of the elements within a group. For example, a subset of lanes from a serial link with eight total lanes may include any number of lanes, up to and including eight lanes.

Still further, as used in the present specification and in the appended claims, the term "a number of" or similar language may include any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Turning now to the Figures, FIG. 1 is a diagram of a system (100) for managing a multi-lane serial link (104) according to one example of the principles described herein. As described above, computing devices or components within a computing device, may transfer data between one another across a link. Examples of computing devices may include laptop computers, desktop computers, smart phones, personal digital assistants, tablets, among other computing devices. Examples of components include input/output devices, input/output controllers, and memory devices, among other integrated circuits. For example, the link may allow an input/output device to transfer data to and from an input/output device controller. For simplicity, the system (100) as depicted in FIG. 1 indicates transmission of data between a number of integrated circuits (101a, 101b).

To transmit data each integrated circuit (101) may include a transmitter (102) and a receiver (103). For example, a first transmitter (102a) on a first integrated circuit (101a) may transmit data to a second receiver (103b) on a second integrated circuit (101b) across a first serial link (104a). Similarly, a second transmitter (102b) on the second integrated circuit (101b) may transmit data to a first receiver (103a) on the first integrated circuit (101a) across a second serial link (104b). While FIG. 1 depicts a single first serial link (104a) and a single second serial link (104b), the serial links (104) may include any number of lanes. In other words, the serial links (104) do not indicate a specific number of lanes, but rather refer to the path of communication between the integrated circuits (101).

As indicated above, in some examples, a SerDes link may be established between the first integrated circuit (101a) and the second integrated circuit (101b). In this example, the first integrated circuit (101a) and the second integrated circuit (101b) may include SerDes components. For example, the first integrated circuit (101a) may receive a number of parallel data transmissions (106a). In this example, the integrated circuit (101a) may receive the parallel data transmissions (106a), serialize them, and transmit them across the first serial link (104a). The second integrated circuit (101b) may receive the serialized data and may deserialize it into a number of parallel data transmissions (106b).

Similarly, the second serial link (104b) may be a SerDes link. For example, the second integrated circuit (101b) may receive a number of parallel data transmissions (106c). In this example, the second integrated circuit (101b) may receive the parallel data transmissions (106c), serialize them, and transmit them across the second serial link (104b). The first integrated circuit (101b) may receive the serial data transmission and may deserialize it into a number of parallel data transmissions (106d). In summary, the serial links (104) may allow for serial transmission of parallel data streams. The use of a serial link (104) may be beneficial in that it provides a low cost option for transmitting data. Transmitting data across the serial link (104) may also be a low power option as the number of communicating pins and wires may be reduced.

The system (100) may also include a number of link controllers (105) that manage the serial links (104). Generally, the link controllers (105) may comprise a computer readable medium, a computer readable storage medium, or a non-transitory computer readable medium, among others. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The link controllers (105) may carry out different management functions of the serial links (104). For example, the link controllers (105a, 105b) may establish a serial link (104) between the integrated circuits (101a, 101b). Such establishment may include communicating sampling rates, sending transfer patterns, aligning signals, aligning bits, and performing handshake operations, among other initialization procedures. For example, the first link controller (105a) may receive an indication that four lanes of the first serial link (104a) are to be used to transmit data. Accordingly, a first link controller (105a) and a second link controller (105b) may implement a number of operations to establish the four lane first serial link (104a).

Similarly, the second link controller (105b) may receive an indication that four lanes of a second serial link (104b) are to be used to transmit data. Accordingly, the second link controller (105b) and the first link controller (105a) may implement a number of operations to establish the four lane second serial link (104b).

The link controllers (105a, 105b) may select to change the transmission states of a number of the lanes in a serial link (104). For example, the link controllers (105a, 105b) may receive an indication that an increase in bandwidth may be needed to facilitate the transfer of data. Accordingly, the link controllers (105a, 105b) may select how many, and which, lanes of a serial link (104) may be added to the existing transmission lanes to facilitate an increased data transfer. Similarly, the link controllers (105a, 105b) may receive an indication that a decrease in bandwidth usage may be desired based on a reduced amount of data traffic. Accordingly, the link controllers (105a, 105b) may select how many, and which, lanes of a serial link (104) to shut down to conserve power and reduce communication bandwidth usage. In both examples, the link controllers (105a, 105b) may change the transmission state of a number of lanes of the serial link (104) based on the indication received.

A few examples of adding and removing lanes are given as follows. In one example, the first serial link (104a) may include active transmission along four lanes from the first integrated circuit (101a) to the second integrated circuit (101b). A first link controller (105a) may receive an indication that additional bandwidth is needed to accommodate an increase in data transmission traffic. Accordingly, the first link controller (105a) may select to use an additional four lanes of the first serial link (104a) to facilitate the increased traffic. The first link controller (105a) may then add the additional lanes. Adding the additional lanes may include configuring the additional lanes for transmitting data. Such configuration may include communicating sampling rates, sending transfer patterns, aligning signals, aligning bits, and performing handshaking operations, among other initialization procedures. In this example, the four previously active lanes may continue to transmit data, without being interrupted by the "training" of the additional lanes. When the additional four lanes have completed the "training," the link controller (105a) may temporarily interrupt all lanes of the first serial link (104a) to synchronize the lanes for concurrent data transfer. More detail concerning the addition of active lanes is given below in connection with FIG. 4.

In another example, the first serial link (104a) may comprise active transmission along eight lanes from the first integrated circuit (101a) to the second integrated circuit (101b). The first link controller (105a) may receive an indication that a reduced bandwidth may be used to conserve power in the face of a decrease in data transmission traffic. Accordingly, the first link controller (105a) may select to remove four lanes to facilitate the reduced need for bandwidth. The first link controller (105a) may then remove the lanes. Removing the lanes may include performing a number of operations to shut down transmissions on a number of lanes. In this example, the four previously active lanes that are to remain active may continue to transmit data, without being interrupted by the "shutting down" of the lanes to be removed. When the four lanes have completed the "shutting down" phase, the first link controller (105a) may temporarily interrupt all lanes of the first serial link (104a) to synchronize the lanes for data transfer. More detail concerning the addition of active lanes is given below in connection with FIG. 5. While specific reference is given to the first link controller (105a) adding or removing lanes from the first serial link (104a), the second link controller (105b) may similarly add or remove lanes from the second serial link (104b).

A link controller (105) that can carry out the above described functionality may be beneficial in that it affords the flexibility of adjusting the quantity of lanes on which data is transferred which may result in more efficient use of a serial link (104), all while providing reliable and low cost communication. Moreover, the ability to transmit data on existing lanes while adding or removing a number of lanes reduces the loss of bandwidth, as data is continually transmitted on a number of lines, and not all lines are shut down during this period.

Figure 2:
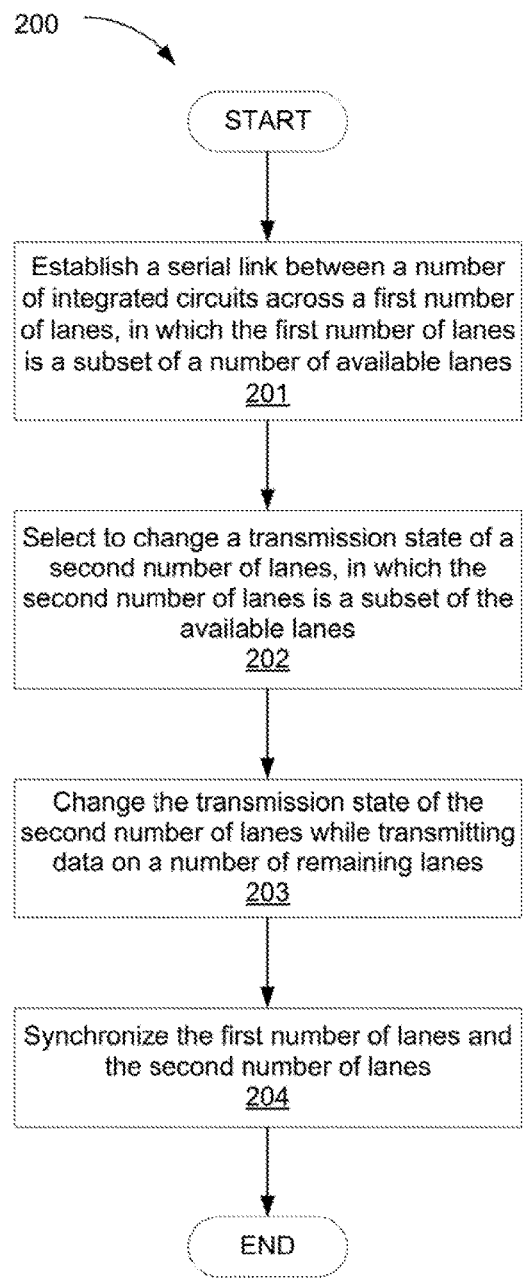
FIG. 2 is a flowchart of a method for managing a multi-lane serial link according to one example of the principles described herein.

FIG. 2 is a flowchart of a method (200) for managing a multi-lane serial link (FIG. 1, 104) according to one example of the principles described herein. The method (200) may include establishing (block 201) a serial link (FIG. 1, 104) between a number of integrated circuits (FIG. 1, 101) across a first number of lanes. The first number of lanes may be a subset of a number of available lanes of the serial link (FIG. 1, 104). For example, the serial link (FIG. 1, 104) may have a capacity to transmit data across eight transmission lanes. In this example, the link controller (FIG. 1, 105) may setup four of those lanes to transmit data from the first integrated circuit (FIG. 1, 101a) to the second integrated circuit (FIG. 1, 101b). As used herein, a subset of lanes may include any amount of lanes up to, and including the number of available lanes. For example, if a serial link (FIG. 1, 104) has eight available lanes to transmit data on, the subset may include any number of lanes up to, and including, eight lanes.

Establishing (block 201) a serial link between a number of integrated circuits (FIG. 1, 101) across a first number of lanes of a serial link (FIG. 1, 104) may include performing a number of operations to establish the serial link (FIG. 1, 104). For example, a link controller (FIG. 1, 105) may send metadata or other data to establish (block 201) the serial link (FIG. 1, 104). Examples of such information include, clock information, transfer patterns, bits and bit alignment information, signal alignment information, crediting information, location verification information, ACK and NACK messages, and handshake operations, among other initialization information.

The method (200) may include selecting (block 202) to change a transmission state of a second number of lanes. The second number of lanes may be a subset of the available lanes of a serial link (FIG. 1, 104). Changing the transmission state may include activating data transfer on a number of lanes of the serial link (FIG. 1, 104). Changing the transmission state may also include shutting down data transfer on a number of the first number of lanes of the serial link (FIG. 1, 104). For example, as will be described in more detail below, the link controller (FIG. 1, 105) may receive an indication of an impending increase in data traffic between the integrated circuits (FIG. 1, 101). Accordingly, the link controller (FIG. 1, 105) may select to activate a number of additional lanes to facilitate the impending increase in data traffic. In another example, the link controller may receive an indication of an impending decrease in data traffic between the integrated circuits (FIG. 1, 101). In this example, the link controller (FIG. 1, 105) may select to shut down a number of lanes to conserve power consumption and increase bandwidth efficiency.

Based on the selection, the transmission state of the second number of lanes may be changed (block 203). While the transmissions state of the second number of lanes is being changed (block 203), data transfer on the remaining lanes may continue. As used herein, remaining lanes may refer to transmission lanes whose transmission state is to be preserved. For example, if data is initially being transmitted across five transmission lanes, and two of those transmission lanes are to be removed, the remaining lanes may refer to the three transmission lanes to remain after removing the two lanes. Similarly, if data is initially being transmitted across four transmission lines and two transmission lines are to be added, the remaining lanes may refer to the four transmission lanes. Thus, while the transmission state of the second number of lanes is being changed (block 203), data transfer may continue on the remaining lanes.

Changing the transmission state of the second number of lanes may include executing a number of operations to setup the second number of lanes. In other words, the transmission state of the second number of lanes may change from a dormant state to an active state. As described above, such operations may include sending metadata or other data to setup a lane. Examples of such information include, clock information, transfer patterns, bits and bit alignment information, signal alignment information, crediting information, location verification information, ACK and NACK messages, and handshake operations, among other initialization information.

Changing the transmission state of the second number of lanes may include executing a number of operations to shut down the second number of lanes. In this example, the transmission state of the second number of lanes may change from an active state to a dormant state.

Changing (block 203) the transmission state of the second number of lanes while transmitting data on the remaining lanes may be beneficial in that a certain amount of bandwidth is maintained while the transmission state of the second number of lanes is adjusted. Accordingly, a total loss of bandwidth along the serial link (FIG. 1, 104) is avoided, which may reduce the impact of changing the number of transmission lanes.

The method (200) may include synchronizing (block 204) the first number of lanes and the second number of lanes. Synchronizing (block 204) the first number of lanes and the second number of lanes may include aligning the lanes for data transfer. In some examples the lanes may be synchronized after receiving an indication that the transmission state of the second number of lanes has been changed. For example, after a number of operations have been executed to 1) setup a number of lanes, 2) remove a number of lanes, or combinations thereof, the first number of lanes and the second number of lanes may be temporarily interrupted to align the transmissions across the lanes. During this temporary interruption, training patterns may be passed across the lanes and alignment relative to one another may be found. Once these and other synchronization operations have been completed, the lanes may be reopened for data transmission. While all lanes may be temporarily interrupted during synchronization which may result in a reduction of bandwidth, the interruption during synchronization may result in a less significant drop in bandwidth as compared to a complete shutdown of all lanes and the total loss of bandwidth may be for a much shorter period of time.

The method (200) as described herein may be beneficial in that it allows flexible data management by selectively changing the number of lanes of a serial link (FIG. 1, 104) on which data is transferred based on such factors as anticipated data traffic. Moreover, maintaining communications on a number of lanes while the transmission state of other lanes is being changed may reduce the performance impact of the changing of lanes.

Figure 3:
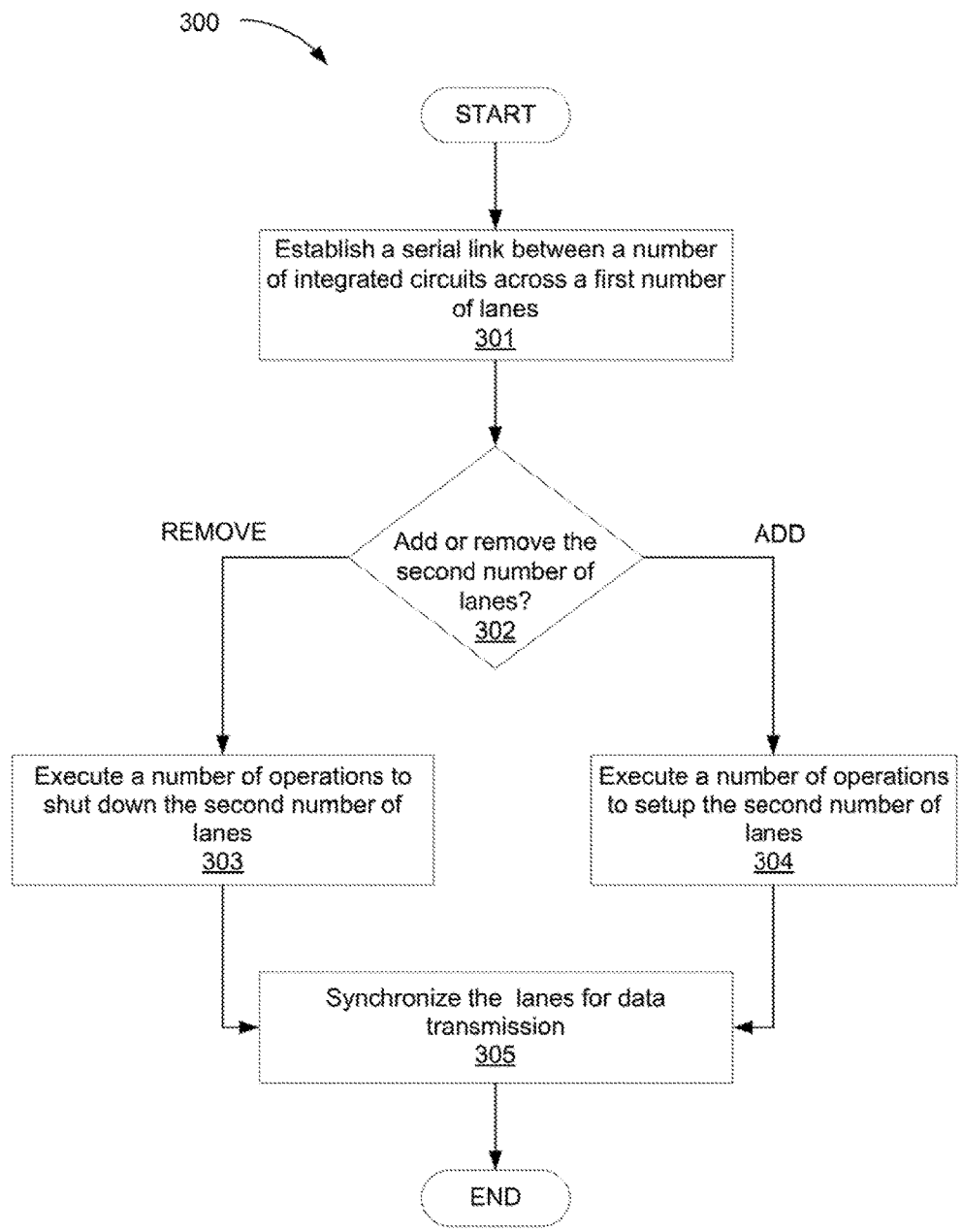
FIG. 3 is a flowchart of another method for managing a multi-lane serial link according to one example of the principles described herein.

FIG. 3 is a flowchart of another method (300) for managing a multi-lane serial link (FIG. 1, 104) according to one example of the principles described herein. The method (300) may include establishing (block 301) a serial link (FIG. 1, 104) between a number of integrated circuits (FIG. 1, 101) across a first number of lanes of the serial link (FIG. 1, 104). This may be performed as described in connection with FIG. 2. The method (300) may include selecting (block 302) to add or remove a second number of lanes. For example, as described above, a link controller (FIG. 1, 105) may select to add a number of lanes in response to a perceived increase in data traffic between the integrated circuits (FIG. 1, 101). By comparison, a link controller (FIG. 1, 105) may select to remove a number of lanes in response to a perceived decrease in data traffic between the integrated circuits (FIG. 1, 101). Removing a number of lanes in response to an impending decrease in data traffic may conserve power by transmitting data on fewer lanes.

If the second number of lanes are to be added (block 302, determination ADD), a number of operations to setup the second number of lanes may be executed (block 304). In this example, the second number of lanes may be dormant lanes upon selection to be added, meaning no data was previously being transferred on these lanes. Examples of such information include, clock information, transfer patterns, bits and bit alignment information, signal alignment information, crediting information, location verification information, ACK and NACK messages, and handshake operations, among other initialization information. While a number of operations are executed (block 304) to setup the second number of lanes, data transmission may continue on the remaining lanes. In other words, the first number of lanes on which a serial link (FIG. 1, 104) was established (block 301) may continue to transmit data.

By comparison, if the second number of lanes are to be removed (block 302, determination REMOVE), a number of operations to shut down the second number of lanes may be executed (block 303). In this example, the second number of lanes may be active lanes upon selection to be removed, meaning data was actively being transferred on these lanes. While a number of operations are executed (block 303) to shut down the second number of lanes, data transmission may continue on the remaining lanes. In other words, the number of first lanes on which data will continue to be transferred after executing (block 303) these operations, may continue to transmit data. The method (300) may include synchronizing (block 305) the lanes for data transmission. This may be performed as described in connection with FIG. 2.

Figure 4:
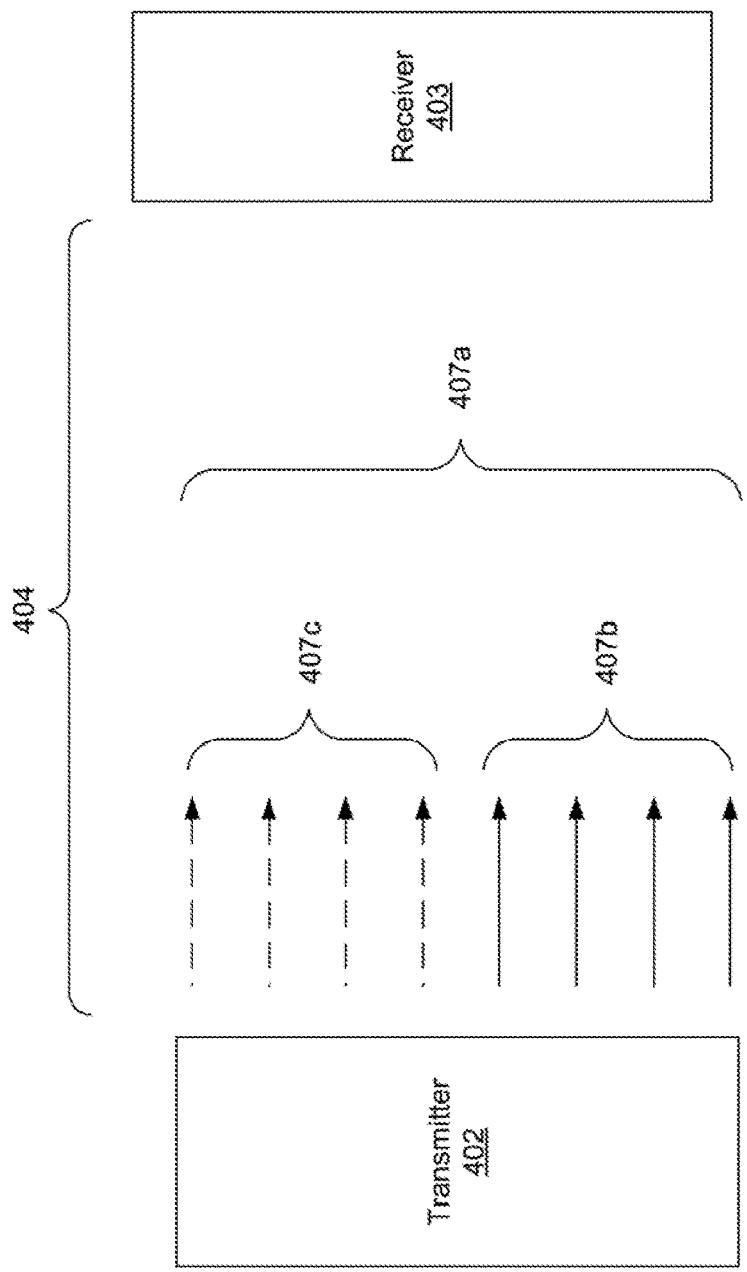
FIG. 4 is a diagram of a system for adding a number of lanes according to one example of the principles described herein.

FIG. 4 is a diagram of a system for adding a number of lanes (407) according to one example of the principles described herein. As described above, a serial link (404) may include a number of available lanes (407a) to transfer data from a transmitter (402) to a receiver (403). The available lanes (407a) may refer to a capacity of a serial link (404) to transmit serial information. For example, as depicted in FIG. 4, a serial link (404) may have capacity to transmit data across eight available lanes (407a). While FIG. 4 depicts a serial link (404) with eight available lanes (407a), a serial link (404) may be made up of any number of available lanes (407a).

As described above, a serial connection between the transmitter (402) and the receiver (403) may be established over a first number of lanes (407b) as indicated by solid arrows. The first number of lanes (407b) may be setup by executing a number of initialization operations as described herein.

In this example, the link controller (FIG. 1, 105) may receive an indication of an impending increase in data traffic. Accordingly, the link controller (FIG. 1, 105) may elect to add a second number of lanes (407c) as indicated by the dashed arrows. In this example, the second number of lanes (407c) may be dormant upon selection to be added, meaning there is no active transfer of data between the transmitter (402) and the receiver (403) across the second number of lanes (407c) prior to the selection to add the lanes. In response to the indication of an impending increase in data traffic, the link controller (FIG. 1, 105) may execute a number of operations on the second number of lanes (407c) to set up data transmission along these lanes (407c). During this time, data transfer may continue along the first number of lanes (407b). In other words, data transfer along the first number of lanes (407b) may be uninterrupted while the second number of lanes (407c) are being set up for communication. Once the number of operations to set up the second number of lanes (407c) have been completed, the first number of lanes (407b) and the second number of lanes (407c) may be temporarily interrupted and synchronized for concurrent data transfer. After such synchronization, the first number of lanes (407b) and the second number of lanes (407c) may be re-started and may continue to transfer data.

Figure 5:
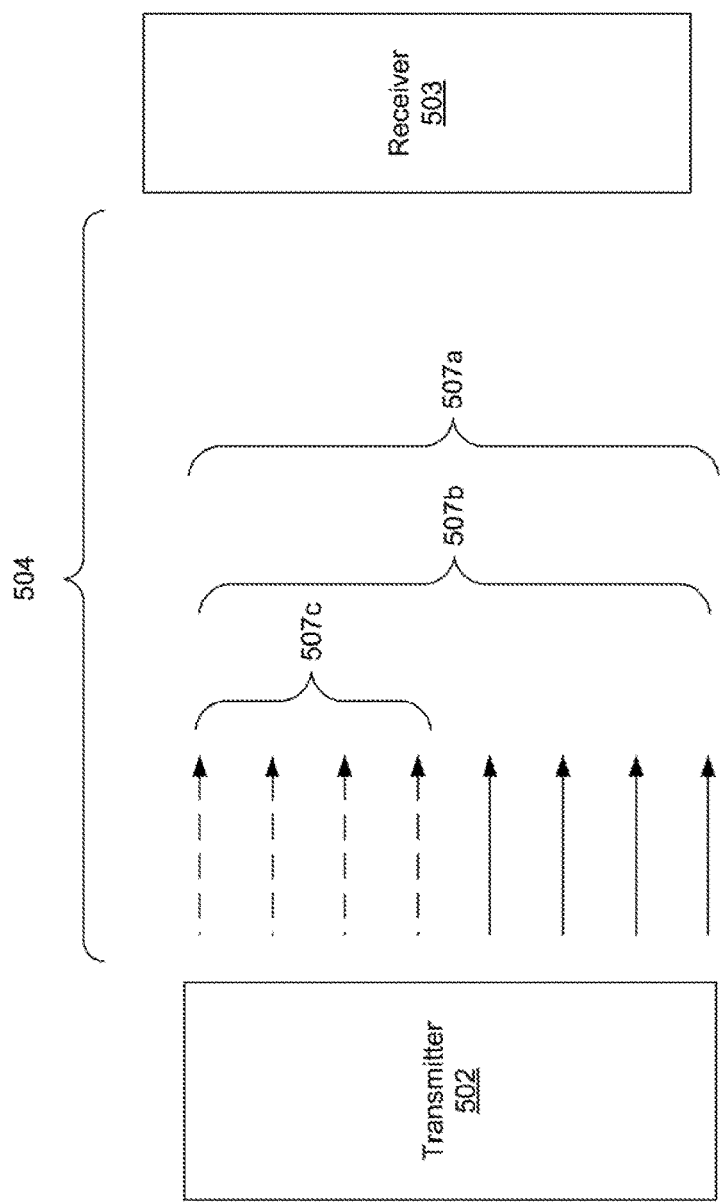
FIG. 5 is a diagram of a system for removing a number of lanes according to one example of the principles described herein.

FIG. 5 is a diagram of a system for removing a number of lanes (507) according to one example of the principles described herein. As described above, a serial link (504) may include a number of available lanes (507a) to transfer data from a transmitter (502) to a receiver (503). The available lanes (507a) may refer to a capacity of a serial link (504) to transmit serial information. For example, as depicted in FIG. 5, a serial link (504) may have capacity to transmit data across eight available lanes (507a). While FIG. 5 depicts a serial link (504) with eight available lanes (507a) a serial link (504) may be made up of any number of available lanes (507a).

As described above, a serial connection between the transmitter (502) and the receiver (503) may be established over a first number of lanes (507b). As depicted in FIG. 5, in some examples the first number of lanes (507b) may include all the available lanes (507a). The first number of lanes (507b) may be setup by executing a number of initialization operations as described herein.

In this example, the link controller (FIG. 1, 105) may receive an indication of an impending decrease in data traffic. Accordingly, the link controller (FIG. 1, 105) may elect to remove a second number of lanes (507c) as indicated by the dashed arrows. In this example, the second number of lanes (507c) may be active upon selection to be removed, meaning there is active transfer of data between the transmitter (502) and the receiver (503) across the second number of lanes (507c) prior to the selection to remove the lanes. In response to the indication of an impending decrease in data traffic, the link controller (FIG. 1, 105) may execute a number of operations on the second number of lanes (507c) to shut down data transmission along these lanes (507c). During this time, data transfer may continue across the remaining lanes. The remaining lanes are indicated as solid arrows in FIG. 5. In other words, data transfer along the remaining lanes may be uninterrupted while the second number of lanes (507c) are being shut down. Once the number of operations to shut down the second number of lanes (507c) have been completed, the first number of lanes (507b) and the second number of lanes (507c) may be temporarily interrupted and synchronized for concurrent data transfer. After such synchronization, the remaining lanes may be re-started and continue to transfer data.

Figure 6:
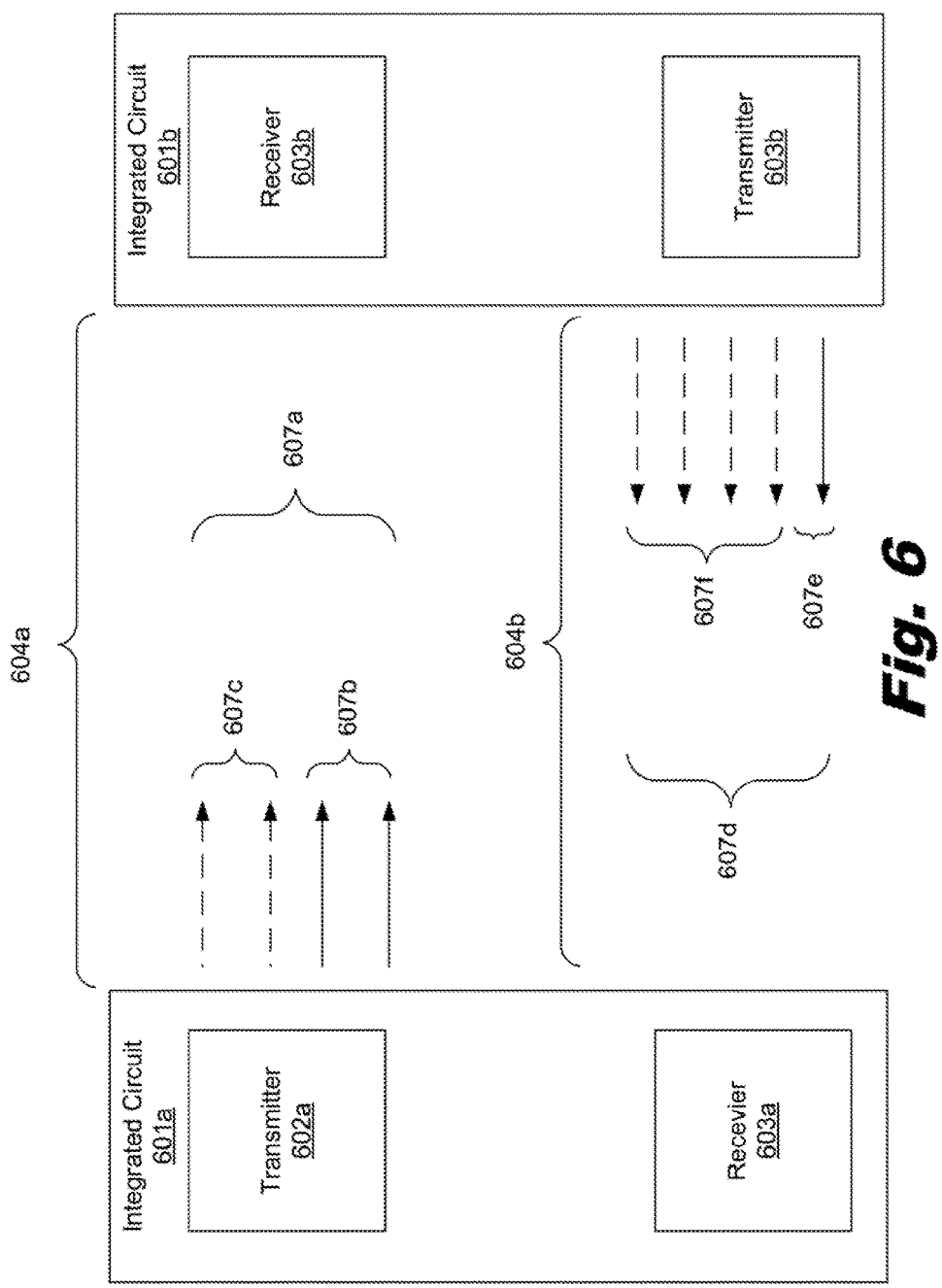
FIG. 6 is a diagram of a system for managing multiple multi-lane serial links according to one example of the principles described herein.

FIG. 6 is a diagram of a system for managing multiple multi-lane serial links (604) according to one example of the principles described herein. In some examples, integrated circuits (601) may transfer data between one another using a number of serial links (604). For example, data may be transferred from the first integrated circuit (601a) and received by the second integrated circuit (601b) across the first serial link (604a). Similarly, data may be transferred from the second integrated circuit (601b) and received by the first integrated circuit (601a) across the second serial link (604b). As described above, each serial link (604) may be made up of a number of available lanes (607a, 607d) and a number of lanes (607b, 607e) on which serial communication is initially established. Each serial link (604) may also include a number of lanes (607c, 607f) whose transmission state is to be changed from dormant to active, active to dormant, or combinations thereof. In some examples the number of lanes (607a, 607b, 607c) in the first serial link (604a) and the number of lanes (607d, 607e, 607f) in the second serial link may be different. For example, the first serial link (604a) may have a first number of available lanes (607a) and the second serial link (604b) may have a second number of available lanes (607d). The first number of available lanes (607a) and the second number of available lanes (607d) may be different from one another.

Similarly, the first serial link (604a) may have a first number of lanes (607b) on which serial communication is initially established and the second serial link (604b) may have a third number of lanes (607e) on which serial communication is initially established. The first number of lanes (607b) and the third number of lanes (607e) may be different from one another. Still further, the first serial link (604a) may have a second number of lanes (607c) whose transmission state is to be changed, and the second serial link (604b) may have a fourth number of lanes (607f) whose transmission state is to be changed. The second number of lanes (607b) and the fourth number of lanes (607f) may be different from one another. While FIG. 6 depicts specific numbers of the different types of lane (607), any number of any type of lane (607) may be implemented in accordance with the principles described herein. Still further, while FIG. 6 depicts the addition of a number of lanes, any combination of addition or lanes and removal of lanes may be implemented in either direction between the first integrated circuit (601a) and the second integrated circuit (601b). For example, lanes could be added across the first serial link (604a) and lanes could be removed across the second serial link (604b).

Allowing multiple serial links (604) in opposite directions may facilitate transmission and reception of information at both integrated circuits (601). Moreover, allowing different numbers of lanes (607) to be used in either direction may be beneficial in that it allows further flexibility and customization of the communication system (FIG. 1, 100).

Figure 7:
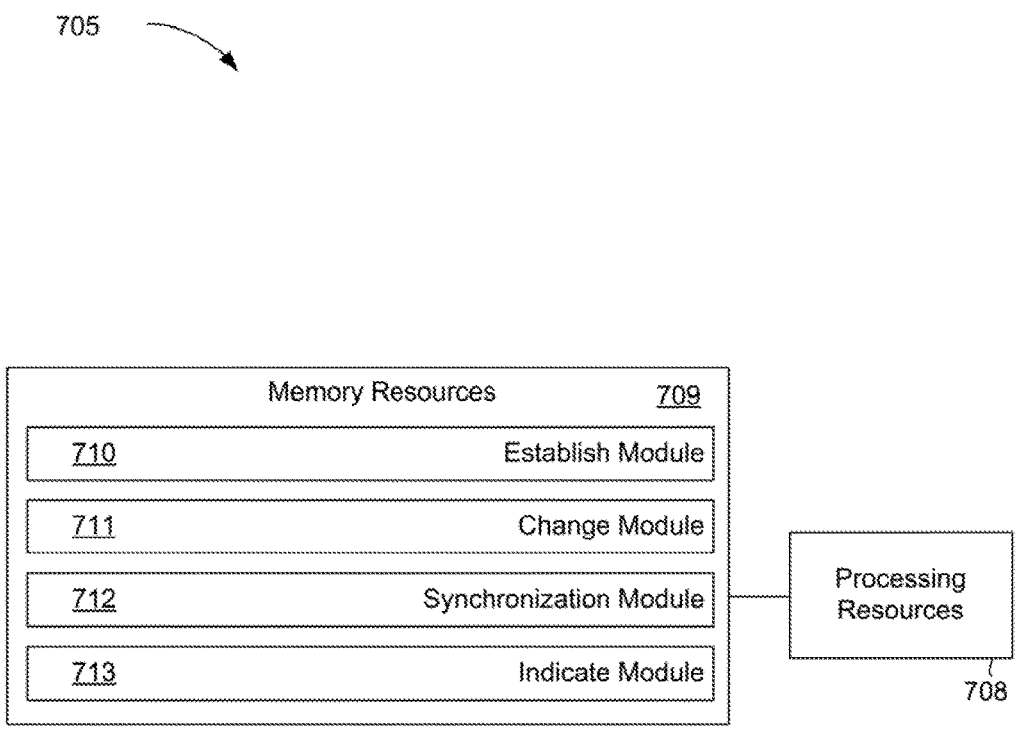
FIG. 7 is a diagram of a link controller for managing a multi-lane serial link according to one example of the principles described herein.

FIG. 7 is a diagram of a link controller (705) for managing a multi-lane serial link (FIG. 1, 104) according to one example of the principles described herein. The link controller (705) may include the hardware architecture to retrieve executable code and execute the executable code. The executable code may, when executed by the link controller (705), cause the link controller (705) to implement at least the functionality of managing a multi-lane serial link (FIG. 1, 104), according to the methods of the present specification described herein. In the course of executing code, the link controller (705) may receive input from and provide output to a number of the remaining hardware units.

In this example, the link controller (705) may include processing resources (708) that are in communication with memory resources (709). Processing resources (708) may include at least one processor and other resources used to process programmed instructions. The memory resources (709) represent generally any memory capable of storing data such as programmed instructions or data structures used by the link controller (705). The programmed instructions shown stored in the memory resources (709) may include an establish module (710), a change module (711), a synchronization module (712), and an indicate module (713).

The memory resources (709) include a computer readable storage medium that contains computer readable program code to cause tasks to be executed by the processing resources (708). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The establish module (710) represents programmed instructions that, when executed, cause the processing resources (708) to establish a serial link (FIG. 1, 104) between a number of integrated circuits (FIG. 1, 101) across a first number of lanes (FIG. 4, 407*b*). The first number of lanes (FIG. 4, 407*b*) may be a subset of a number of available lanes (FIG. 4, 407*a*) on the serial link (FIG. 1, 104). The change module (711) represents programmed instructions that, when executed, cause the processing resources (708) to change a transmission state of a second number of lanes (FIG. 4, 407*c*) while transmitting data on a number of remaining lanes. The second number of lanes (FIG. 4, 407*c*) may be a subset of the available lanes (FIG. 4, 407*a*). The synchronization module (712) represents programmed instructions that, when executed, cause the processing resources (708) to synchronize the first number of lanes (FIG. 4, 407*b*) and second number of lanes (FIG. 4, 407*c*) after changing the transmission state of the second number of lanes (FIG. 4, 407*c*). The indicate module (713) represents programmed instructions that, when executed, cause the processing resources (708) to indicate when to change the transmission state of the second number of lanes (FIG. 4, 407*c*).

Further, the memory resources (709) may be part of an installation package. In response to installing the installation package, the programmed instructions of the memory resources (709) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (708) and the memory resources (709) are located within the same physical component, such as a server, or a network component. The memory resources (709) may be part of the physical component's main memory, caches, registers, non-volatile memory, or elsewhere in the physical component's memory hierarchy. Alternatively, the memory resources (709) may be in communication with the processing resources (708) over a network. Further, the data structures, such as the libraries, may be accessed from a remote location over a network connection while the programmed instructions are located locally. Thus, the link controller (705) may be implemented on a user device, on a server, on a collection of servers, or combinations thereof.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processing resources (708) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Methods and systems for managing a multi-lane serial link (FIG. 1, 104) may have a number of advantages, including: (1) providing flexibility in communication by allowing addition, or removal, of a number of lanes (FIG. 4, 407); (2) reducing performance impacts that occur when the number of lanes (FIG. 4, 407) is adjusted; (3) providing a low cost communication system; and (4) providing a low power consumption communication system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for managing a multi-lane serial link, comprising:
    establishing a serial link between a number of integrated circuits across a first number of lanes, in which the first number of lanes comprises a subset of a number of available lanes on the serial link;

selecting to change a transmission state of a second number of lanes, in which the second number of lanes comprises a subset of the available lanes;

changing the transmission state of the second number of lanes while transmitting data on a number of remaining lanes; and after receiving an indication that the transmission state of the second number of lanes has been changed, synchronizing the first number of lanes and the second number of lanes.

2. The method of claim 1, in which the serial link is a serializer/deserializer (SERDES) link.

3. The method of claim 1, in which changing the transmission state of the second number of lanes comprises executing a number of operations to setup the second number of lanes.

4. The method of claim 1, in which changing the transmission state of the second number of lanes comprises executing a number of operations to shut down the second number of lanes.

5. The method of claim 1, in which changing the transmission state of the second number of lanes comprises, changing the second number of lanes from a dormant state to an active state, changing the second number of lanes from an active state to a dormant state, or combinations thereof.

6. A system for managing a multi-lane serial link, comprising:
a processor;
memory communicatively coupled to the processor; and
a link controller, the link controller comprising:
an establish module to establish a serial link between a number of integrated circuits across a first number of lanes, in which the first number of lanes comprises a subset of a number of available lanes on the serial link;
a change module to change a transmission state of a second number of lanes while transmitting data on a number of remaining lanes, in which the second number of lanes comprises a subset of the available lanes;
an indicate module to indicate when to change the transmission state of the second number of lanes; and
a synchronization module to synchronize the available number of lanes after changing the transmission state of the second number of lanes.

7. The system of claim 6, in which the serial link is a serializer/deserializer (SERDES) link and in which the link controller is a SERDES controller.

8. The system of claim 6, in which the second number of lanes are dormant upon selection.

9. The system of claim 6, in which the second number of lanes are active upon selection.

10. A computer program product for managing a multi-lane serial link, the computer program product comprising:
a non-transitory computer readable storage medium comprising computer usable program code embodied therewith, the computer usable program code comprising:
computer usable program code to, when executed by a processor, establish a first serial link between a number of integrated circuits across a first number of lanes, in which the first number of lanes comprises a subset of a number of available lanes on the serial link;
computer usable program code to, when executed by a processor, select to change a transmission state of a second number of lanes, in which the second number of lanes comprises at least one of the available lanes;
computer usable program code to, when executed by a processor, change the transmission state of the second number of lanes while transmitting data on a first number of remaining lanes; and
computer usable program code to, when executed by a processor, synchronize the first number of lanes and the second number of lanes for data transmission after receiving an indication that the transmission state of the second number of lanes has been changed.

11. The product of claim 10, in which the serial link is a serializer/deserializer (SERDES) link.

12. The product of claim 10, further comprising:
computer usable program code to, when executed by a processor, establish a second serial link between a number of integrated circuits across a third number of lanes, in which the second number of lanes comprises a subset of a number of available lanes on the second serial link;
computer usable program code to, when executed by a processor, select to change a transmission state of a fourth number of lanes, in which the fourth number of lanes comprises a subset of the number of available lanes on the second serial link;
computer usable program code to, when executed by a processor, change the transmission state of the fourth number of lanes while transmitting data on the second number of remaining lanes; and
computer usable program code to, when executed by a processor, synchronize the third number of lanes and the fourth number of lanes.

13. The product of claim 12, in which the second serial link transmits data in an opposite direction of the first serial link, and in which the fourth number of lanes is less than or greater than the second number of lanes.

14. A method for managing a multi-lane serial link, comprising:
establishing a serial link between a number of integrated circuits across a first number of lanes, in which the first number of lanes comprises a subset of a number of available lanes on the serial link;
selecting to change a transmission state of a second number of lanes, in which the second number of lanes comprises a subset of the available lanes;
changing the transmission state of the second number of lanes while transmitting data on a number of remaining lanes, wherein changing the transmission state of the second number of lanes comprises executing a number of operations to setup the second number of lanes; and
synchronizing the first number of lanes and the second number of lanes.

15. A method for managing a multi-lane serial link, comprising:
establishing a serial link between a number of integrated circuits across a first number of lanes, in which the first number of lanes comprises a subset of a number of available lanes on the serial link;
selecting to change a transmission state of a second number of lanes, in which the second number of lanes comprises a subset of the available lanes;
changing the transmission state of the second number of lanes while transmitting data on a number of remaining lanes, wherein changing the transmission state of the second number of lanes comprises executing a number of operations to shut down the second number of lanes; and
synchronizing the first number of lanes and the second number of lanes.

16. A method for managing a multi-lane serial link, comprising:

establishing a serial link between a number of integrated circuits across a first number of lanes, in which the first number of lanes comprises a subset of a number of available lanes on the serial link;

selecting to change a transmission state of a second number of lanes, in which the second number of lanes comprises a subset of the available lanes;

changing the transmission state of the second number of lanes while transmitting data on a number of remaining lanes, wherein changing the transmission state of the second number of lanes comprises changing the second number of lanes from a dormant state to an active state, changing the second number of lanes from an active state to a dormant state, or combinations thereof; and synchronizing the first number of lanes and the second number of lanes.

17. A system for managing a multi-lane serial link, comprising:

a processor;

memory communicatively coupled to the processor; and a link controller, the link controller comprising:

an establish module to establish a serial link between a number of integrated circuits across a first number of lanes, in which the first number of lanes comprises a subset of a number of available lanes on the serial link;

a change module to change a transmission state of a second number of lanes that are active upon selection while transmitting data on a number of remaining lanes, in which the second number of lanes comprises a subset of the available lanes; and a synchronization module to synchronize the available number of lanes after changing the transmission state of the second number of lanes.

\* \* \* \* \*